United States Patent [19]

Nitardy

[11] Patent Number: 5,396,651

[45] Date of Patent: Mar. 7, 1995

[54] RADIO COMMUNICATION SYSTEM INCLUDING INDICATION THAT COMMUNICATION LINK IS ESTABLISHED

[75] Inventor: John H. Nitardy, Seattle, Wash.

[73] Assignee: The Boeing Company, Seattle, Wash.

[21] Appl. No.: 862,600

[22] Filed: Apr. 1, 1992

[51] Int. Cl.$^6$ .................. H04B 1/38; H04B 17/00
[52] U.S. Cl. .................. 455/54.2; 455/67.1; 455/67.7; 455/88
[58] Field of Search ............... 455/9, 38.1, 38.2, 38.4, 455/67.1, 49.1, 54.2, 67.7, 69, 88, 54.1, 34.1, 34.2; 379/59, 61, 63

[56] References Cited

U.S. PATENT DOCUMENTS

| | | | |
|---|---|---|---|
| 3,973,200 | 8/1976 | Akerberg | 455/38.2 |
| 4,173,016 | 10/1979 | Dickson | 455/38.2 |
| 4,953,198 | 8/1990 | Daly et al. | 455/34.2 |
| 5,058,205 | 10/1991 | Roehrs et al. | 455/38.4 |
| 5,125,101 | 6/1992 | Johnson et al. | 455/54.1 |

*Primary Examiner*—Reinhard J. Eisenzopf
*Assistant Examiner*—Nguyen Vo
*Attorney, Agent, or Firm*—Christensen, O'Connor, Johnson & Kindness

[57] ABSTRACT

A networked radio communication system for transmitting a radio signal between a source transceiver and a plurality of destination transceivers. The source transceiver first transmits an interrogate signal that includes a synchronize code and an address code that is indicative of a particular destination transceiver. If the particular destination transceiver receives the interrogate signal, an acknowledge signal that includes the address of the destination transceiver that is transmitting the acknowledge signal is transmitted back to the source transceiver. The source transceiver compares the address included in the interrogate signal with the address included in the received acknowledge signal and determines if a communications link is established. If a communication link is established, a feedback signal is provided to the operator of a source transceiver indicating that the source transceiver is in communication with the particular destination transceiver. The feedback signal preferably includes a sidetone signal which allows an operator of the source transceiver to monitor signals transmitted from the source transceiver to the plurality of destination transceivers.

9 Claims, 6 Drawing Sheets

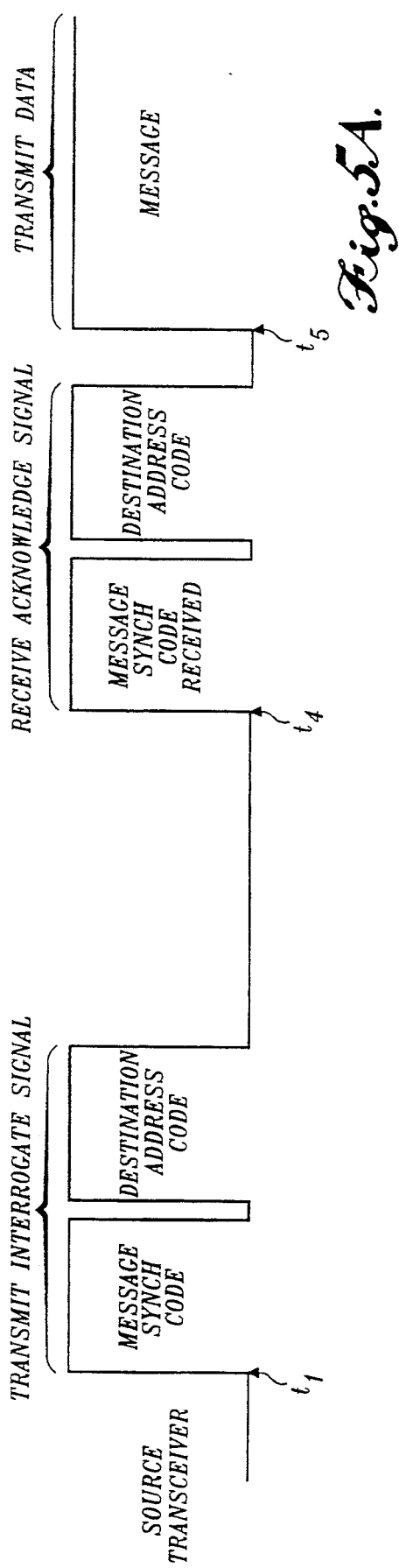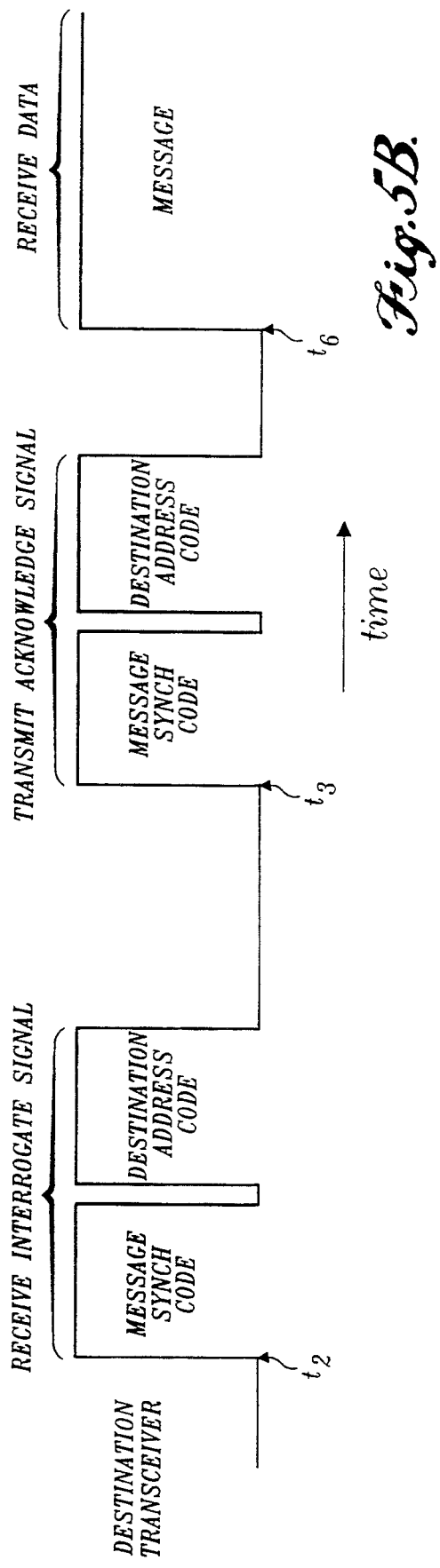

RADIO COMMUNICATION SYSTEM INCLUDING INDICATION THAT COMMUNICATION LINK IS ESTABLISHED

FIELD OF THE INVENTION

The present invention relates to communication systems in general and, in particular, to networked radio communication systems.

BACKGROUND OF THE INVENTION

In present audio radio communication systems used onboard aircraft, a certain percentage of time is spent by the pilot or co-pilot determining whether a communication link has been established with an intended receiver. This time, called overhead time, not only prevents the pilot from concentrating on other tasks related to flying the aircraft but also contributes to the inefficient use of radio communications frequencies. In a typical aircraft radio communication system, the overhead time is the time it takes the pilot to transmit a voiced call signal to a destination receiver asking the destination receiver to respond plus the time it takes to receive a voiced acknowledge signal from the destination receiver indicating that the call signal was received. The pilot, upon hearing the received acknowledge signal, knows that a communication link has been established with the destination receiver and that the pilot can then begin transmitting information that will be received by the destination.

While such a method of establishing a communication link works well for communication systems having no need to limit overhead time, there are some situations in which it is desirable to (a) eliminate the need for an operator to spend time transmitting signals in order to determine whether a communication link has been established and (b) reduce the time spent transmitting signals having little informational value (like the call and acknowledge signals). This is particularly true in a networked communication system where one operator may be attempting to communicate with several destination receivers at the same time. At the present time, an operator communicating on a network must determine if he is in communication with each network receiver by transmitting a call signal to all of the network receivers and waiting for an acknowledge signal to be transmitted from each receiver that is in communication with the operator. This process not only involves multiple transmissions of signals having little informational value, thereby contributing to an inefficient use of radio communication frequencies, but is also distracting for the operator.

Therefore, a need exists for a communication system that automatically provides an operator with an indication of whether a communication link has been established with an intended destination receiver. Such a communication system should reduce the overhead time spent determining whether a communication link has been established, as well as increase the efficiency of a radio frequency by minimizing the amount of time that radio signals are transmitted and received on the particular frequency for the purpose of determining if a communication link has been established.

SUMMARY OF THE INVENTION

In accordance with the present invention, a communication system that reduces the overhead time spent determining if a radio communication link is established, by automatically alerting the operator of a source transceiver when a communication link is established, is provided. The communication system includes a source transceiver and at least one destination transceiver. Before any voice communication signals are transmitted from the source transceiver, the source transmitter transmits an interrogate signal to the destination transceiver. When the destination transceiver receives the interrogate signal, the destination transceiver transmits an acknowledge signal to the source transceiver. The source transceiver analyzes the received acknowledge signal and alerts the operator that a communication link has been established between the source and the destination.

In accordance with other aspects of this invention, the operator is alerted that a communication link has been established by a feedback signal that occurs when a suitable acknowledge signal is received. Preferably, the feedback signal closes an electrical path to allow the operator to hear his voice communication as it is being transmitted. Thus, failure to hear his voice alerts the operator that a communication link has not been established.

In accordance with yet another aspect of this invention, the communication system is configured in a network having a source transceiver and a plurality of destination transceivers each of which is identified by a unique address. The source transceiver transmits the interrogate signal to a particular one of the destination transceivers and receives an acknowledge signal from the particular transceiver. By selecting the particular destination transceiver to be the transceiver on the network with which it is the most difficult to establish a communication link, once a communication link is established with the particular transceiver, it can be assumed that the source transceiver is in communication with all the transceivers on the network.

As will be readily appreciated from the foregoing summary, the present invention eliminates the need for an operator to spend time determining if a communication link has been established with the destination receiver. Also, the present invention increases the efficiency of a particular radio frequency by minimizing the time spent transmitting signals that determine if a communication link is established.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein:

FIGS. 5A and 5B are timing diagrams of interrogate and acknowledge signals transmitted according to the present invention.

DETAILED DESCRIPTION OF THE PREFERRED EMBODIMENT

Figure 1:
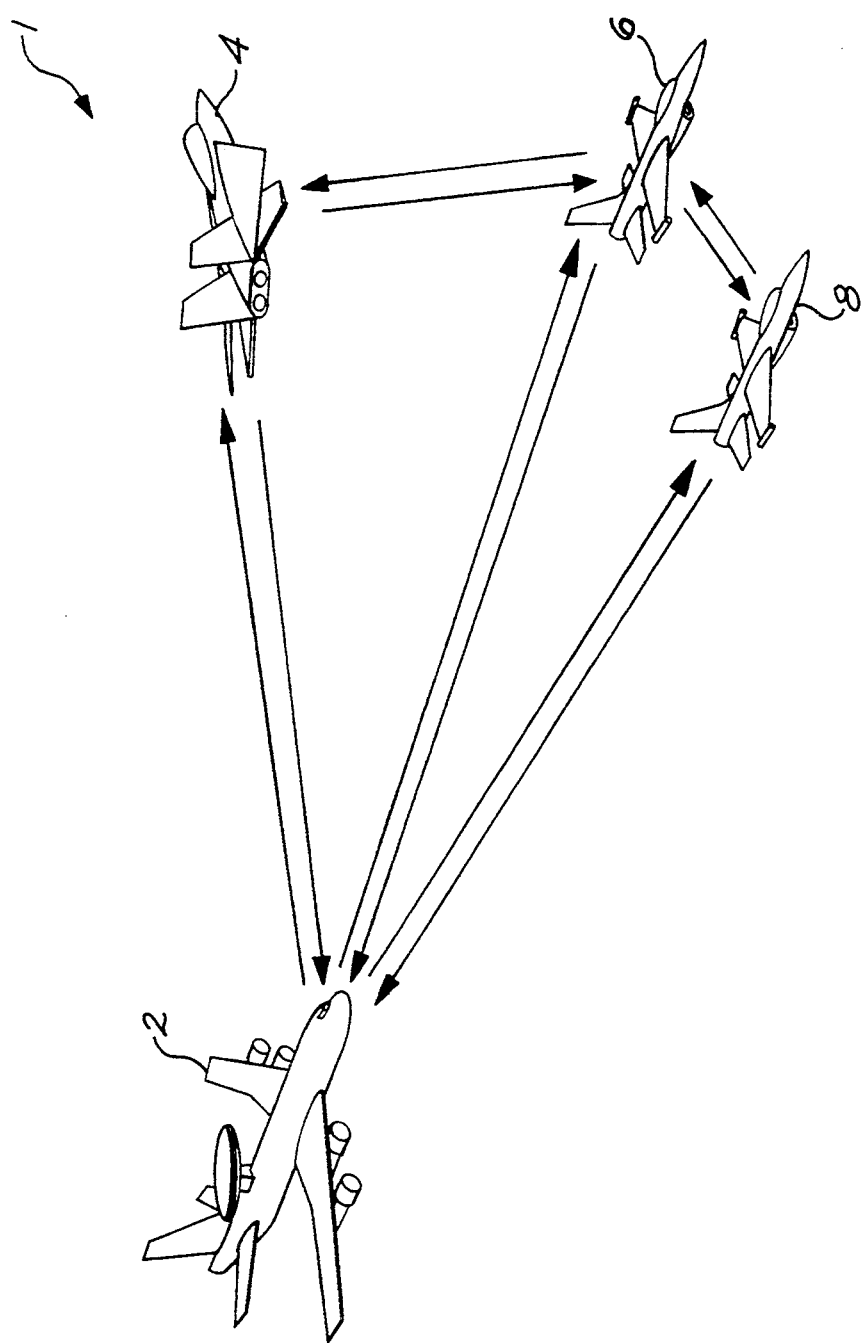
FIG. 1 is a pictorial representation of an aircraft radio communication network.

FIG. 1 is a pictorial representation of an aircraft radio communication network. The network 1 includes a central command aircraft 2 and three fighter aircraft 4, 6 and 8. Each aircraft in the network can communicate with the remaining aircraft and control tower on a single radio frequency. In prior art radio communication networks, a pilot of an aircraft wishing to communicate with the network members would have to transmit a call signal to the network members and wait for an appropriate acknowledge to be transmitted back. To be certain that the pilot was in communication with all the members, the pilot would need to wait for a separate acknowledge signal to be transmitted back from each member of the network that had received the call signal. As will be appreciated, the overhead time required to ascertain whether a communication link had been established with all the members of the network increases in direct proportion to the number of members in the network. As described above, this overhead time not only contributes to inefficient use of the radio communication frequencies, but also distracts the pilot. A radio communication system according to the present invention avoids this problem by indicating to an operator of the system when a communication link exists with all the members of a network, in a minimum amount of time. Although the system is described for use in a network, it will be appreciated that the system could be used for communication between a source and a single destination.

Figure 2:
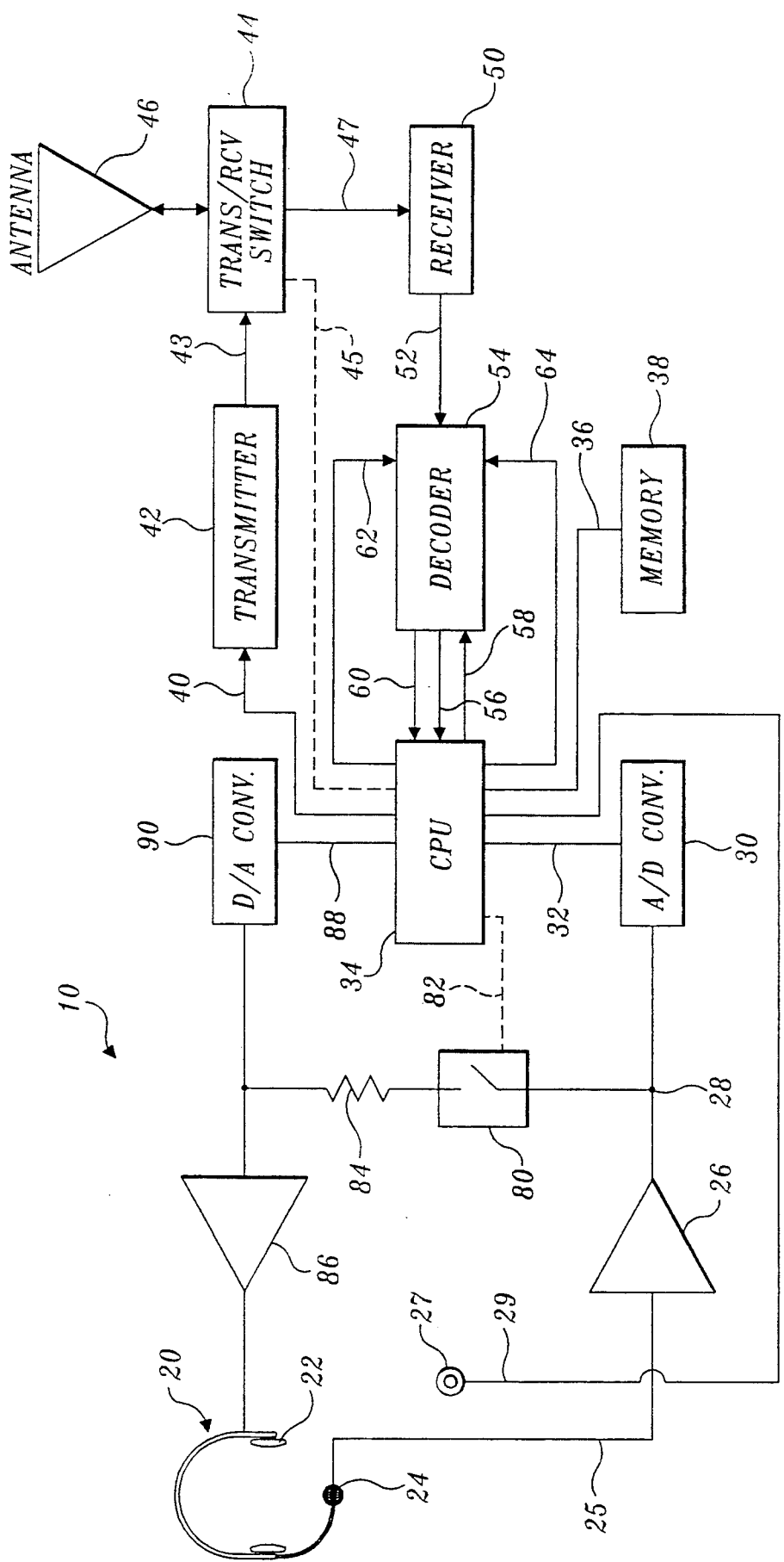
FIG. 2 is a block diagram of a source/destination transceiver formed in accordance with the present invention for use in a radio communication system.

FIG. 2 shows a block diagram of a transceiver 10 according to the present invention suitable for use in forming a radio communication system of the type described above. The transceiver 10 can function as either a source transmitter or a destination receiver. When functioning as a source, the transceiver transmits radio frequency signals to a destination transceiver and, when operating as a destination receiver, the transceiver 10 receives radio frequency signals from another transceiver that is acting as a source.

The transceiver 10 comprises a headset 20 that includes a set of earphones 22 and a microphone 24. The microphone 24 is coupled to an audio amplifier 26 by a lead 25. The output of audio amplifier 26 is coupled by a lead 28 to an analog-to-digital converter 30. The analog-to-digital converter samples the voice signal input to microphone 24 and converts the voice signal into a digital signal, which is transferred to a central processing unit (CPU)34 that includes a microprocessor and associated components, over a lead 32. Also coupled to CPU 34, by a lead 36, is a memory unit 38. The memory unit 38 stores a computer program and data needed to control the operation of the transceiver 10 in the manner illustrated in FIGS. 3 and 4 and described below.

A "push-to-talk" button 27 is connected to the CPU 34 by a lead 29. When the operator of the transceiver 10 wants to begin transmitting information, the push-to-talk button 27 is pressed, causing the CPU to begin receiving the voice signal input into the microphone 24 and sampled by the A/D converter 30. As described below, before any information (i.e., a digitized voice signal) is actually transmitted to a destination transceiver, the operator is provided with an indication of whether a communication link has been established with the intended destination transceiver.

The information that is to be transmitted by the transceiver 10 is fed by the CPU 34 to a transmitter 42 on a lead 40. The transmitter 42 is coupled to an antenna 46 through a transmit/receive switch 44. The CPU 34 controls the position of transmit/receive switch 44 via control signals transmitted on a lead 45. When the transceiver 10 is transmitting radio signals, the transmit/receive switch 44 is set in a transmit position and, when the transceiver is not transmitting radio signals, the transmit/receive switch 44 is set in a receive position. The transmitter 42 modulates a suitable carrier frequency with the digitized voice signal received from the A/D converter 30 via the CPU 34 according to any one of several techniques well known to those skilled in the radio communications art. The transmitter 42 may also encrypt the digitized voice signal before the voice signal is transmitted using known encryption techniques, as will be appreciated by those skilled in the art of communications.

Coupled to the transmit/receive switch 44 by a lead 47 is a receiver 50. The receiver 50 receives and mixes the radio frequency signals transmitted by the destination transceiver down to an intermediate frequency signal, which is fed to a decoder 54 on a lead 52. The decoder 54 detects the digital signals in the intermediate frequency signal and synchronizes the CPU 34 to the beginning of a transmission from the destination transceiver. The decoder 54 also aids in determining whether a communication link has been established with the intended destination transceiver, as will be discussed below.

The output of the decoder 54 is coupled to the CPU 34 by a lead 56. The CPU 34 receives the digital signals and transfers them to a digital-to-analog (D/A) converter 90 over a lead 88. The digital-to-analog converter 90 converts the received digital signals from a digital form to analog form so that they can be understood by a human operator. The output of the digital-to-analog converter 90 is coupled to an audio amplifier 86 which drives the set of earphones 22, thereby allowing the operator of source transceiver 10 to hear the received signals.

A switch 80 in series with a resistor 84 is coupled between the output audio amplifier 86 and the output of the D/A converter 90. When the switch is open, the operator cannot hear his voice signal and any background noise input into the microphone 24 in the earphones 22. When the switch is closed, the operator can hear his voice signal input into the microphone 24 in the earphones 22. The status of the switch 80 is controlled by the CPU 34, such that the switch is closed when a communication link is established with the destination transceiver. Thus, the operator's ability to hear his voice and background noise in the earphones 22 provides feedback to the operator indicating that a communication link has been established with the destination transceiver.

Turning now to a more detailed description of the operation of the transceiver 10 illustrated in FIG. 2, upon pressing the push-to-talk button 27, the CPU first determines if a communication link has been established with the destination transceiver. More specifically, before any information (i.e., a digitized voice signal) is transmitted to the destination transceiver, the CPU 34 generates an interrogate signal that is transmitted to the destination transceiver. As shown in FIG. 5A, the interrogate signal includes a message sync code and a destination address code. Each transceiver unit included within the network is assigned a unique address that distinguishes that unit from all the other transceivers in the network. If the addressed destination transceiver receives the interrogate signal, the CPU of the destination generates an acknowledge signal that is transmitted back to the source transceiver 10. As shown in FIG. 5B, the acknowledge signal includes the message sync code and the destination address code.

The decoder 54 of the source transceiver analyzes the received acknowledge signal to determine if the acknowledge signal is correct. If the acknowledge signal is correct, a signal is sent to the CPU 34 that causes the CPU 34 to close the switch 80, thereby allowing the operator to hear the operator's voice signal and background noise input into microphone 24 in the earphones 22. Hearing the voice signal input to microphone 24 in the earphones 22 provides the operator with an indication that a communication link exists between the source transceiver 10 and the destination transceiver. Using this so-called "sidetone" feedback signal provided by switch 80 eliminates the need for the operator of the source transceiver to employ the usual communications protocol of transmitting a voiced call signal asking whether the intended transceiver can hear the communication being transmitted and waiting for a voiced reply from the destination. If the operator cannot hear his own voice or background noise in the earphones 22, he immediately knows that the communication link has not been established. The presence or absence of the sidetone signal is easily recognized by the operator.

While the presently preferred way of indicating when a communication link has been established is to allow the operator to hear his transmissions, the present invention is not intended to be limited to closing a switch to allow a sidetone to be heard when a communication link has been established. Other types of feedback indications can be used. For example, the CPU 34 could turn on a light when a communication link is established. If a light is used instead of a sidetone as the feedback signal, the operator can tell, by looking at the light, when signals from his transceiver are being received by a destination transceiver. If the light is on, the operator knows that any signals transmitted are being received by the destination transceiver. If the light is out, the signals are not being received.

Figure 3:
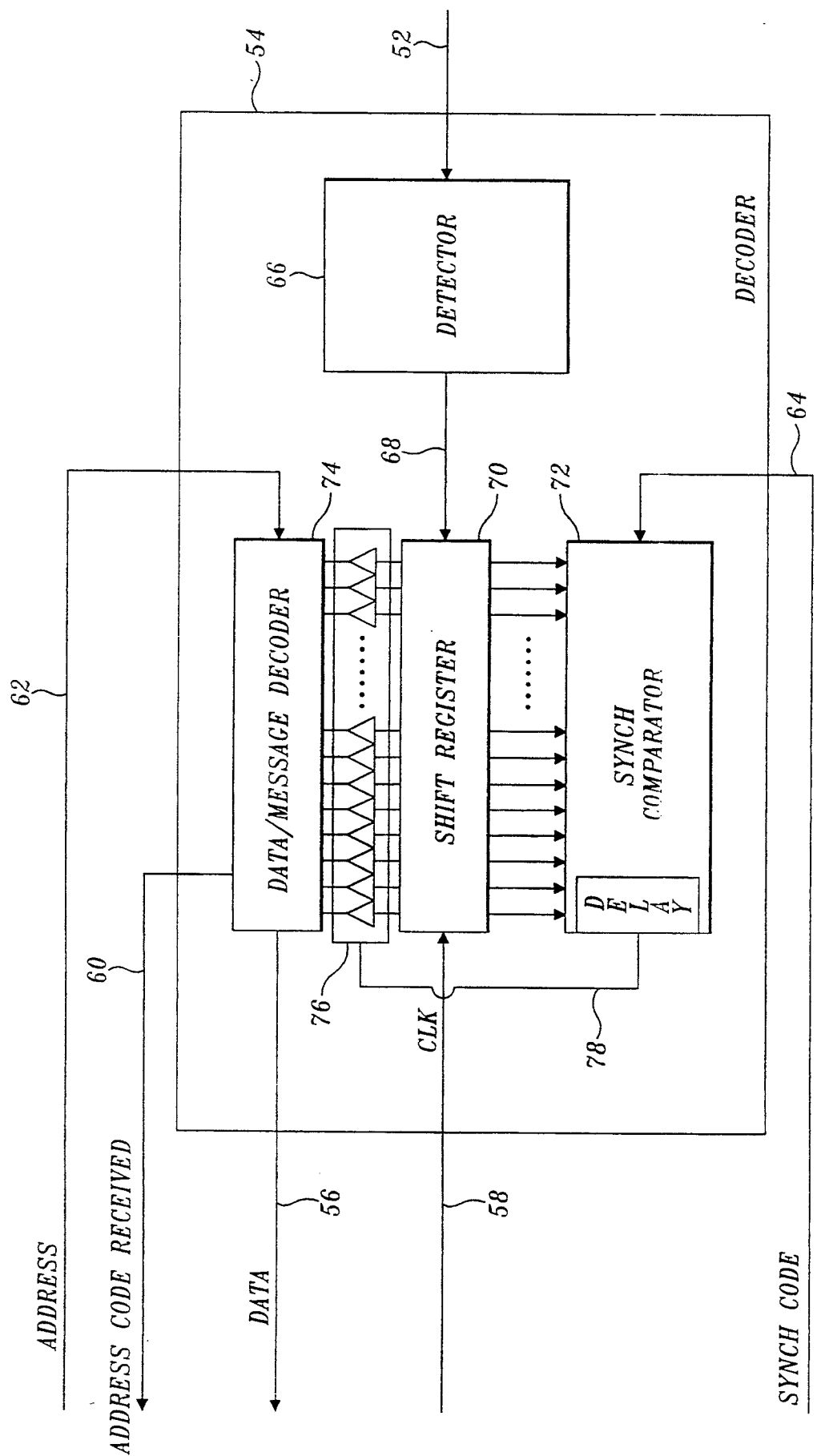
FIG. 3 is a more detailed block diagram of a decoder shown in FIG. 2.

The components that comprise the decoder 54 of FIG. 2 are more clearly shown in FIG. 3. The decoder 54 includes a detector 66, an n-bit shift register 70, a synchronize comparator 72, and a data/message decoder 74. The detector 66 receives the intermediate frequency signals from the receiver 50 on the lead 52. The output of the detector 66 is fed to the shift register 70. Each stage of the n-bit shift register 70 is connected to an input line of the synchronize comparator 72. Each stage of the n-bit shift register 70 is also connected, through a buffer 76, to an input line of the data/message decoder 74. An output line 56 of the data/message decoder 74 is connected to the CPU 34 (shown in FIG. 2). An address lead 62 is connected between the CPU 34 and the data/message decoder 74 and a sync code lead 64 is connected between the CPU 34 and the synchronize comparator 72.

In operation, the signals produced by the receiver are fed from the receiver 50 to the detector 66 on the lead 52. The detector 66 detects the digital signal transmitted from the destination transceiver. However, the detector 66 could be omitted if the synchronize comparator 72 and the data message decoder 74 are designed to handle intermediate frequency signals. The digital signal output from the detector 66 is clocked into the shift register 72 using a clock signal received from the CPU 34 on a lead 58. As will be apparent to those skilled in the art, the clock rate for the source transceiver must be the same as the clock rate at which the digital signal is transmitted from the destination transceiver or some multiple thereof.

As the received digital signal is clocked into the shift register 72, the synchronize comparator 70 continually compares the contents of the shift register 72 with a predetermined message sync code that is received from the CPU 34 on a lead 64 and stored in the synchronize comparator. The predetermined message sync code is, of course, the message sync code transmitted by the transceiver 10 when communication was initiated. See FIG. 5A and the preceding description. Receipt of the synchronize code denotes the beginning of the receipt of a digital signal transmitted by the destination transceiver.

After the contents of the shift register become equivalent to the synchronize code, the synchronize comparator 70 waits a predetermined delay time before sending a strobe signal on a line 78 to enable the buffer 76. Once the buffer 76 is enabled, the contents of the shift register 70 are transferred to the data/message decoder 74. The data/message decoder 74 compares the contents of the shift register 70 with an address code received from the CPU on a line 62. This address code is the destination address code transmitted as part of the interrogate signal (FIG. 5A).

If the received digital signal includes a destination address code that matches the destination address code stored in the data/message decoder 74, the data/message decoder signals the CPU on a lead 60 that a communication link has been established with the intended destination.

In summary, once the address of its intended destination transceiver is selected, an interrogate signal is transmitted. If the intended destination transceiver is able to receive the interrogate signals, an acknowledge signal is transmitted back to the source transceiver. Included within the acknowledge code is the address of the transceiver that is sending the code. If the received address contained within the acknowledge signal matches the address of the intended destination transceiver (that is stored in the data/message decoder 74), a communication link has been established between the source and the intended destination transceiver.

The previous discussion has described what occurs when a transceiver is functioning as a transmitter. In this instance, the address code stored in the data/message decoder is the address of the intended receiver. In contrast, when the transceiver is not transmitting, its address is stored in the data message decoder. That is, the particular address code stored in the data/message decoder 74 at any point in time depends if the data/message decoder is within a transceiver that is transmitting or receiving. If the data/message decoder 74 is part of a transceiver that is transmitting, the address stored in the data/message decoder 74 is the address of the intended destination transceiver. If the decoder 54 is part of a receiving transceiver, the address stored is the transceiver's own address. Since in a network of radio transceivers each transceiver on the network is capable of transmitting and receiving, each transceiver is programmed to store its own address in the data/message decoder 74 until the operator of the transceiver pushes his push-to-talk button 27 shown in FIG. 2. Upon pressing the push-to-talk button, the CPU 34 of the transceiver feeds the appropriate address code to the data/message decoder 74 on the lead 62.

Returning to the situation where a transceiver is operating as a receiver, if the received destination address code is that of the receiving transceiver, an address code received signal is produced in lead 60. As shown in FIG. 5B, receipt of the address code received signal by the CPU causes the CPU to generate a transmit acknowledge signal, which includes the message sync code and the address code of the destination receiver.

Figure 4:
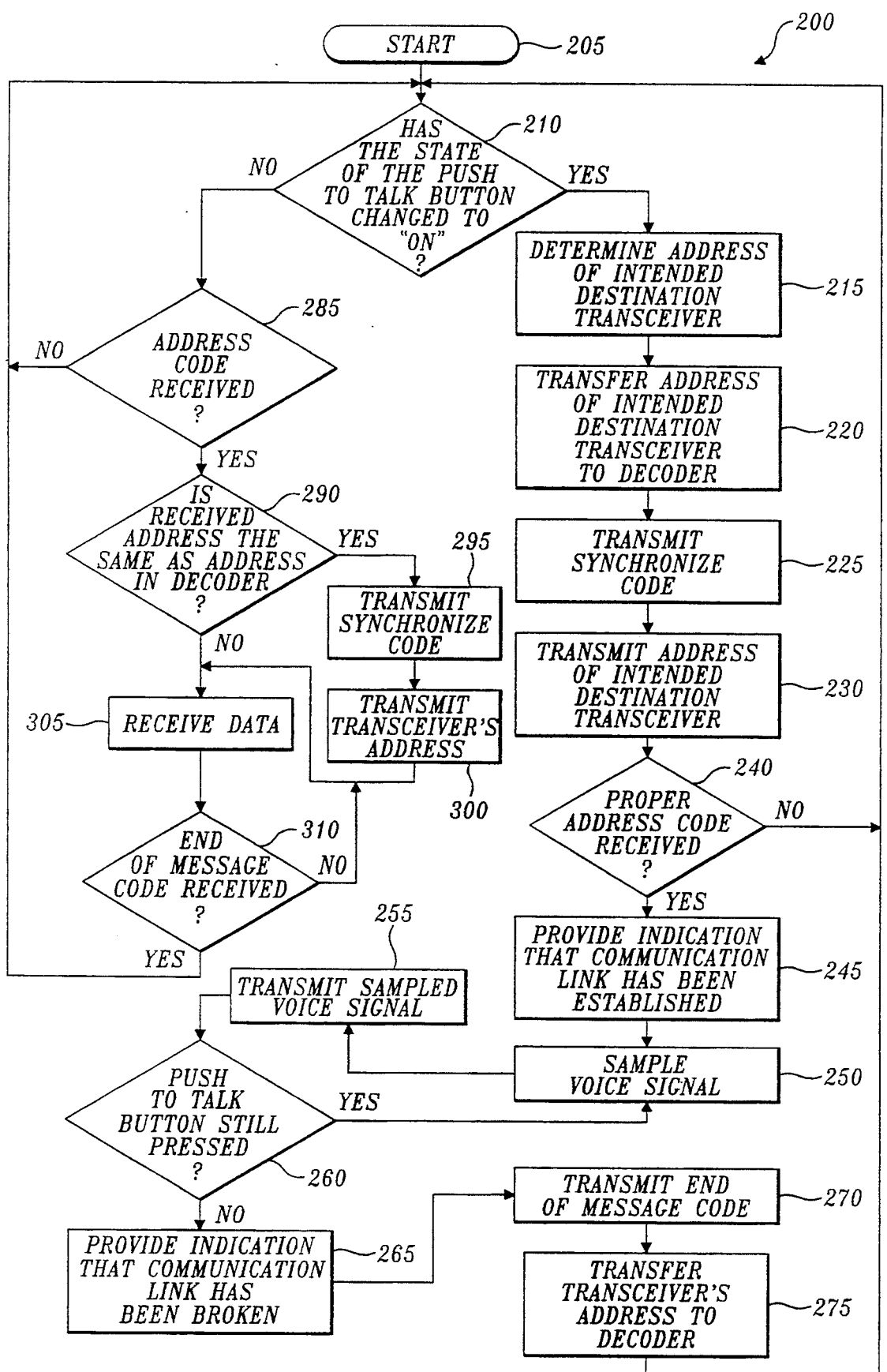
FIG. 4 is a flow chart of a method of programming a source/destination transceiver to operate in the communication system according to the present invention.

FIG. 4 is a flow chart of a computer program suitable for operating the CPU of a transceiver of the type shown in FIG. 3, i.e., a transceiver suitable for use in a communication system according to the present invention. The program 200 begins at a start block 205 and proceeds to determine if the state of the push-to-talk button 27 (shown in FIG. 2) has changed from "off" to "on." See decision block 210. If the push-to-talk button has changed state to "on," meaning the operator of the transceiver wishes to establish a communication link with one of the other transceivers in the network, the program determines the address of the intended destination transceiver. See block 215. The address may be input by the operator via dials or stored in memory as a result of a prior operator input. Alternatively, when the communication system of the present invention is used in a network having more than one destination transceiver, the address of the intended destination transceiver may be chosen to be the address of the transceiver with which it is the most difficult to establish a communication link. This transceiver can be called the "hardest of hearing" transceiver. Determining which of the transceivers is the hardest of hearing is typically a function of which transceiver is the farthest away from the source transceiver. Calculating which transceiver is the hardest of hearing can be accomplished in a variety of ways, including the calculation of received signal-to-noise ratios and transmit powers to determine link losses, as will be apparent to those skilled in the art. The present communication system operates under the assumption that if the source transceiver can establish a communication link with the hardest of hearing transceiver, then it can be assumed that every transceiver on the network is in communication with the source transceiver.

After block 215, the program proceeds to a block 220, whereat the CPU transfers the address of the intended destination transceiver to the data/message decoder 74 shown in FIG. 3. After transferring the address to the decoder, the program causes the source transceiver to transmit a synchronize code (block 225). The synchronize code alerts each of the transceivers on the network that a message is beginning. After block 225, the program causes the transceiver to transmit the address of the intended destination receiver. See block 230.

After transmitting the address of the intended destination receiver, the source transceiver tests the data output of the data/message decoder to determine if the proper address code has been received at a block 240. If the proper address code has not been received, the program loops back to decision block 210. If the proper address code has been received from the intended destination transceiver, then the program causes the source transceiver to provide an indication to the operator that a communication link has been established with the intended destination receiver. See block 245. As described above, the indication preferably involves closing switch 80 (shown in FIG. 2) so that the operator is able to hear his voice in the set of earphones 22 as he speaks into the microphone 24.

While continuously providing an indication to the operator of the source transceiver that a communication link has been established with the intended destination transceiver, the source transceiver receives the sampled input voice signal (block 250) and transmits the voice signal to the transceivers on the network (block 255). As this occurs, the push-to-talk switch input is continuously tested to determine if the operator of the source transceiver is still pressing the push-to-talk button. See block 260. If the answer to the block 260 test is yes, the program loops back to block 250, resulting in the received sampled input voice signal being transmitted to the transceivers on the network (block 255). If the push-to-talk button is no longer being pressed, the program cycles from block 260 to a block 265 whereat the operator of the source transceiver is provided with an indication that the communication link has been broken. Again, such an indication preferably comprises opening switch 80 (shown in FIG. 2) resulting in the operator no longer being able to hear his voice signal and background noise. Finally, after block 265, the source transceiver transmits an end of message code (block 270) that alerts the transceivers on the network that the data sent by the source transceiver has ended. After block 270, the program loop transfers its own address to the decoder (block 275) and back to the decision block 210.

If the source transceiver determines that no transition to "on" of the push-to-talk button has taken place (decision block 2 10), the transceiver determines if an address code has been received (block 285) subsequent to a sync comparison. If no address code has been received, the program loops back to decision block 210.

If an address code has been received, the program determines if the received address code is the same address code that is stored in the transceiver's data/message decoder 74. See block 290. Similar address codes indicate that the source transceiver that transmitted the address code wants the receiving transceiver to transmit an acknowledge signal. Thereafter, the destination transceiver transmits a synchronize code back to the source transceiver (block 295) followed by the destination transceiver's address (block 300).

If the address code received is not the same as the address stored in the destination transceiver's data/message decoder 74 or after transmitting the destination transceiver's address (block 300), data from the source transceiver is converted from a digital to analog form and presented to the operator of the destination transceiver. See block 305. Next, the program continuously tests the incoming data looking for the end of message code. If the end of message code has been received, the transceiver continues to receive data. When the transmission from the source transceiver has ended and the end of message code is received, the program loops back to block 210, where the push-to-talk button input of the transceiver is tested to determine if the operator of the destination transceiver has pressed the push-to-talk button.

As can be seen from the flowchart of FIG. 4, each network transceiver continually polls (tests) the push-to-talk button to see if the operator wishes to establish a communication link with the other transceivers on the network. Upon pressing the push-to-talk button, an interrogate signal that comprises a synchronize code and an address code is transmitted. The address code preferably is the address of the transceiver with which it will be the most difficult to establish a communication link. The intended destination transceiver transmits back an acknowledge code if it receives the interrogate signal that indicates to the source transceiver that a communication link has been established. The operator of the source transceiver is provided an indication that a communication link has been established by closing the switch 80, thereby enabling the operator to hear the input voice signal and background noise in the earphones 22.

FIGS. 5A and 5B are timing diagrams showing the preferred way of transmitting the interrogate and acknowledge signals according to the present invention. Beginning at a time $T_1$, when the operator of the source transceiver presses the push-to-talk button, the source transceiver transmits an interrogate signal that comprises a synchronize code and a destination address code. For example, if the source transceiver were in a network with twenty possible destination transceivers, then the address code transmitted at time $T_1$ could comprise the address of the transceiver with which it was previously found most difficult to establish a communication link.

At a time $T_2$, the destination transceiver receives the interrogate signal. If the signal is received correctly, the destination transceiver transmits an acknowledge signal that comprises a synchronize code and the destination transceiver's address code at a time $T_3$. The acknowledge signal is received by the source transceiver at a time $T_4$. The source transceiver compares the address code originally transmitted at time $T_1$ with the address code received at time $T_4$. If the address codes are the same, the source transceiver begins transmitting data to the destination beginning at a time $T_5$. The data is received by the destination transceiver beginning at time $T_6$. As discussed above, at time $T_5$, the source transceiver provides a feedback signal to the operator of the source that indicates that a communication link has been established with the destination transceiver. If the operator of the source transceiver does not receive the feedback signal, he knows that the communication link has not been established and he either will not be able, or should not attempt, to transmit data to the transceivers on the network. Thus, the present system provides the operator of the source transceiver with an indication of whether a communication link has been established without requiring the usual call and response signals currently required in conventional radio communication systems. Therefore, the present communication system serves to eliminate the operator overhead time spent determining whether a link has been established.

While a preferred embodiment of the invention has been illustrated and described, it will be appreciated that various changes can be made therein without departing from the spirit and scope of the invention. For example, it is not required that the feedback signal comprises closing a switch to allow the operator to monitor the voice signal in his earphones. Other types of feedback signals, such as a light, prerecorded message, etc., could be used to indicate to the operator that a communication link has been established. Similarly, it is not required that the interrogate and acknowledge signals comprise the address of the intended destination. A password system could easily be substituted, depending on the particular communications protocol being implemented. Therefore, it is intended that the scope be determined solely from the following claims.

The embodiments of the invention in which an exclusive property or privilege is claimed are defined as follows:

1. A transceiver for use in a networked radio communication system, which includes a plurality of similar transceivers that function both as source transceivers and destination transceivers, said transceiver and said plurality of similar transceivers allowing operators of said transceiver and said plurality of similar transceivers to communicate with one another, said transceiver comprising:

transmitter means for transmitting an interrogate signal to a particular one of said plurality of similar transceivers when said transceiver is acting as a source transceiver to determine whether a communication link exists between said transceiver and said particular one of said plurality of similar transceivers, and for automatically transmitting an acknowledge signal to said plurality of similar transceivers upon receipt of an interrogate signal from one of said plurality of similar transceivers when said transceiver is acting as a destination transceiver to indicate that a communication link exists between said transceiver and said one of said plurality of similar transceivers, without any action by the operator of said transceiver;

receiving means for receiving an acknowledge signal transmitted from said particular one of said plurality of similar transceivers to indicate that said communication link exists between said transceiver and said particular one of said plurality of similar transceivers, said acknowledge signal being automatically transmitted by said particular one of said plurality of similar transceivers when said particular one of said plurality of similar transceivers receives the interrogate signal transmitted by said transmitter means when said transceiver is acting as a source transceiver, without any action by the operator of said particular one of said plurality of similar transceivers;

decoder means for:
(i) analyzing the acknowledge signal that was received by said receiving means to determine whether said acknowledge signal that was received by said receiving means was transmitted by said particular one of said plurality of similar transceivers; and
(ii) if said acknowledge signal that was received by said receiving means was transmitted by said particular one of said plurality of similar transceivers, then producing a switch signal a microphone for receiving an input voice signal from the operator of said transceiver to be transmitted from said transceiver to said plurality of similar transceivers;

a set of earphones used by the operator of said transceiver to hear signals transmitted to said transceiver from said plurality of similar transceivers; and switch means for coupling said microphone to said set of earphones when said decoder means produces said switch signal, thereby allowing the operator of said transceiver to hear the input voice signal in the earphones as the input voice signal is transmitted by said transceiver to said plurality of similar transceivers, so as to provide the Operator of said transceiver an indication that said communication link has been established with said particular one of said plurality of similar transceivers.

2. The transceiver as in claim 1, wherein each of said similar transceivers is identified by a unique address and wherein said interrogate signal transmitted by said transmitter means when said transceiver is acting as a source transceiver comprises:

a synchronize code that indicates the beginning of said interrogate signal transmitted by said transmitter means when said transceiver is acting as a source transceiver, and an address code that indicates said particular one of said plurality of similar transceivers that is to automatically transmit said acknowledge signal when said particular one of said plurality of similar transceivers receives the interrogate signal transmitted by said transmitter means when said transceiver is acting as a source transceiver.

3. The transceiver as in claim 2, wherein said acknowledge signal transmitted from said particular one of said plurality of similar transceivers includes the address of said particular one of said plurality of similar transceivers; and wherein said decoder means compares the address included in said acknowledge signal transmitted from said particular one of said plurality of similar transceivers with the address included in said interrogate signal transmitted by said transmitter means when said transceiver is acting as a source transceiver and produces said switch signal if said acknowledge signal address and said interrogate signal address are the same.

4. In a radio communication system for transmitting a voice signal from an operator of a source transceiver to an operator of a destination transceiver, the improvement comprising:

means included in said source transceiver for transmitting an interrogate signal from the source transceiver to the destination transceiver to determine whether a communication link exists between said source transceiver and said destination transceiver;

means included in said destination transceiver for transmitting an acknowledge signal to said source transceiver, the acknowledge signal being automatically transmitted upon receipt of the interrogate signal to indicate that said communication link exists between said source transceiver and said destination transceiver, without any action by the operator of said destination transceiver; and means included within said source transceiver for receiving the acknowledge signal and based thereon producing a feedback signal that indicates to the operator of said source transceiver that said communication link has been established between said source transceiver and said destination transceiver, said means for producing a feedback signal including earphones for allowing the operator of said source transceiver to hear the operator's voice signal as the voice signal is transmitted from the source transceiver to the destination transceiver only when said communication link has been established.

5. The communication system of claim 4, wherein the interrogate signal comprises a synchronize code that indicates the beginning of the interrogate signal and an address code that is unique to the destination receiver.

6. The communication system of claim 4, wherein the acknowledge signal transmitted by the destination transceiver to the source transceiver comprises:

a synchronize code that indicates the beginning of the acknowledge signal; and an address code for the destination transceiver.

7. The communication system of claim 6, wherein the means for producing the feedback signal comprises:

a comparator included in said source transceiver that compares an address code of the destination transceiver included in interrogate signal with the address code that is included in the acknowledge signal received from said destination transceiver, the comparator producing the feedback signal if the address code included in the acknowledge signal is the same as the address code in the interrogate signal.

8. A method of determining if a communication link has been established between a source transceiver and a particular one of a plurality of destination transceivers, each of which is identified by a unique address, so that an operator of said source transceiver is allowed to communicate with an operator of said particular destination transceiver, comprising the steps of:

transmitting an interrogate signal from said source transceiver to said particular destination transceiver, said interrogate signal including the unique address of said particular destination transceiver and being transmitted to determine whether a communication link exists between said source transceiver and said particular destination transceiver;

transmitting an acknowledge signal from said particular destination transceiver to said source transceiver automatically upon receipt of the interrogate signal by said particular destination transceiver to indicate that said communication link exists between said source transceiver and said particular destination transceiver without any action by the operator of said particular destination transceiver;

analyzing the acknowledge signal upon receipt of the acknowledge signal by said source transceiver to determine if the acknowledge signal was transmitted from said particular destination transceiver; and providing an indication to the operator of said source transceiver that said communication link has been established between said source transceiver and said particular destination transceiver as a result of said analysis by allowing the operator of said source transceiver to hear via earphones signals transmitted from the source transceiver to the particular destination transceiver.

9. The method of claim 8, wherein the acknowledge signal includes the address of said particular destination transceiver and wherein the step of analyzing the acknowledge signal further comprises the steps of:

comparing the address of said particular destination transceiver included in the interrogate signal with the address included in the acknowledge signal; and producing the indication that said communication link has been established if the addresses are the same.

* * * * *

UNITED STATES PATENT AND TRADEMARK OFFICE
CERTIFICATE OF CORRECTION

Page 1 of 2

PATENT NO. : 5,396,651
DATED : March 7, 1995
INVENTOR(S) : J.H. Nitardy

It is certified that error appears in the above-indentified patent and that said Letters Patent is hereby corrected as shown below:

| COLUMN | LINE | | |
|---|---|---|---|
| 1 | Refs. Cited U.S. Pat Docs | Insert --2,280,421 4/1942 Chappell et al. .... 250/6-- |
| 1 | Refs. Cited U.S. Pat Docs | Insert --2,489,202 11/1949 Selinger .... 179/84-- |
| 1 | Refs. Cited U.S. Pat Docs | Insert --2,881,410 4/1959 Brunn .... 340/164-- |
| 1 | Refs. Cited U.S. Pat Docs | Insert --4,088,983 5/1978 Crandall .... 340/147R-- |
| 1 | Refs. Cited U.S. Pat Docs | Insert --4,257,031 3/1981 Kirner et al. .... 340/149R-- |
| 1 | Refs. Cited U.S. Pat Docs | Insert --4,646,082 2/1987 Engel et al. .... 340/825.54-- |
| 1 | Refs. Cited U.S. Pat Docs | Insert --4,825,193 04/1989 Siwiak et al. .... 340/311.1-- |
| 1 and 2 | Sheet 5 of 6 | Delete FIGURES 4A and 4B. |

UNITED STATES PATENT AND TRADEMARK OFFICE
CERTIFICATE OF CORRECTION

PATENT NO. : 5,396,651
DATED : March 7, 1995
INVENTOR(S) : J.H. Nitardy

Figure 4A:
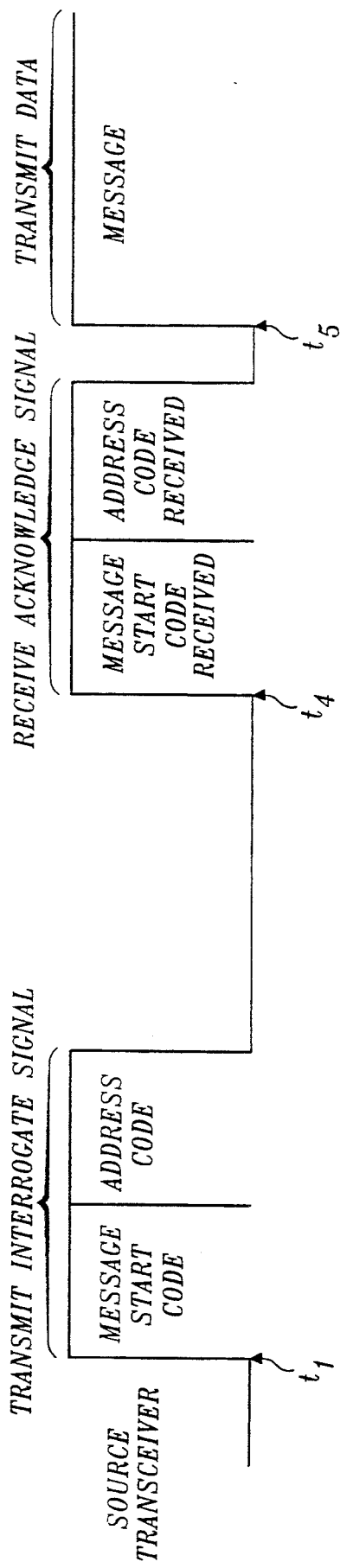
FIGS. 4A and 4B are timing diagrams of interrogate and acknowledge signals transmitted according to the present invention.
Figure 4B:
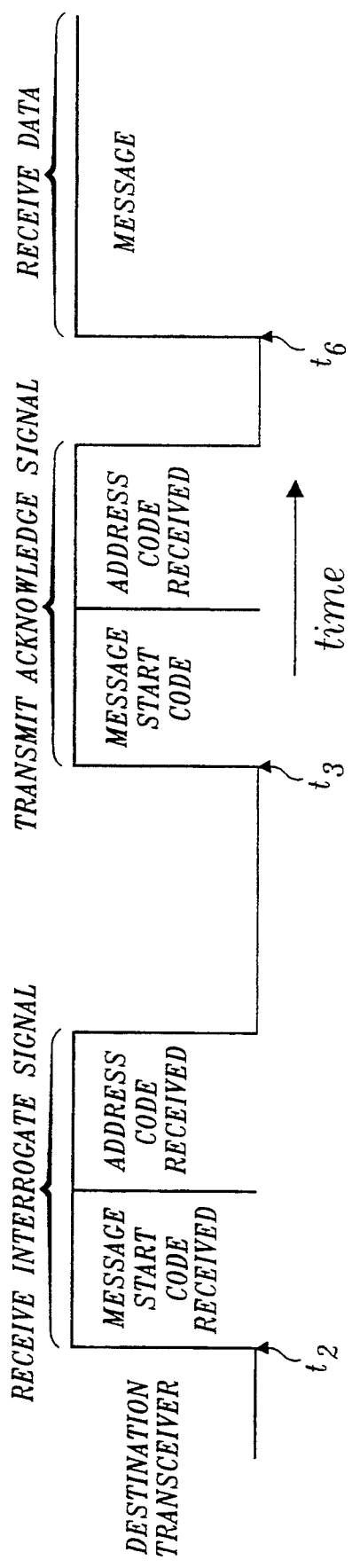

It is certified that error appears in the above-indentified patent and that said Letters Patent is hereby corrected as shown below:

| COLUMN | LINE | |
|---|---|---|
| 2 | 66-68 | Delete "FIGS. 4A and 4B are timing diagrams of interrogate and acknowledge signals transmitted according to the present invention;" |
| 7 | 23 | "on.⇄" should read --"on."-- |
| 11 (Claim 1, | 2 line 63) | "Operator" should read --operator-- |

Signed and Sealed this

Eleventh Day of July, 1995

Attest:

BRUCE LEHMAN

*Attesting Officer*   *Commissioner of Patents and Trademarks*